Figure 2:
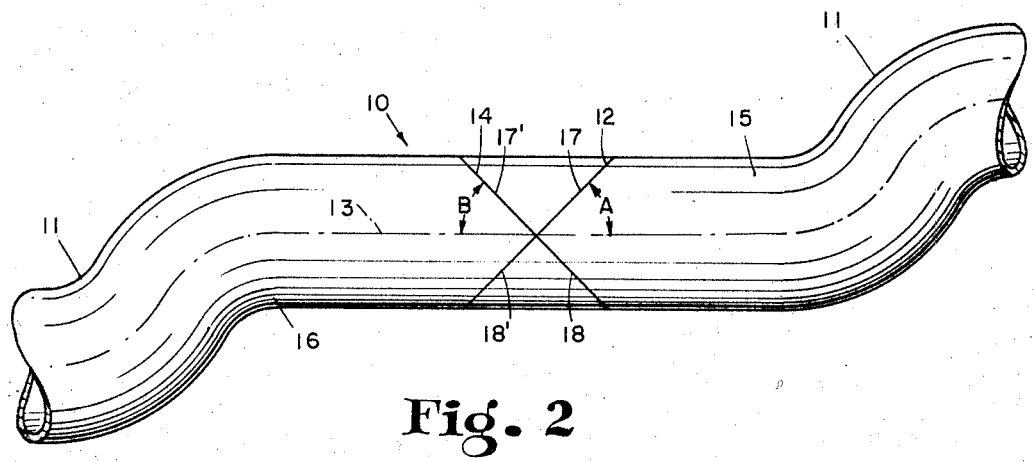

March 25, 1969   J. C. ARTHUR ETAL   3,434,199
METHOD OF FABRICATING PIPES
Filed Oct. 3, 1966

INVENTORS
JAMES C. ARTHUR
GRAHAM F. THIEMAN
BY
ATTORNEYS

United States Patent Office 3,434,199
Patented Mar. 25, 1969

3,434,199
METHOD OF FABRICATING PIPES
James C. Arthur and Graham F. Thieman, Columbus, Ind., assignors to Arvin Industries, Inc., Columbus, Ind., a corporation of Indiana
Filed Oct. 3, 1966, Ser. No. 583,679
Int. Cl. F16l 41/00
U.S. Cl. 29—476                                 6 Claims This invention relates to a method of fabricating a pipe assembly, and more particularly to a method for fabricating pipe assemblies in which a pair of pipe sections are disposed in open communication with a third pipe section at a common juncture.

In the manufacture of exhaust systems for automotive vehicles, it is frequently necessary to connect a pair of curved pipes at a common junction to a third pipe which also may be curved. It has heretofore been the practice in the manufacture of such pipe assemblies to cut each of the three pipes to the length desired, make the necessary bends in each, and then recut the ends of two of the pipes to form a miter joint with an opening located at said joint. The two interconnected pipes are then joined to the third pipe with an open end of the third pipe in open communication with the opening at the miter joint. This method of fabrication requires that each of the three pipes pass down a separate processing line with the necessary balancing of production rates for each of the three lines. It also produces substantial scrap losses since each of the two pipes which are joined together to form the miter joint must be individually cut and their cut ends recut or trimmed in order to form the joint.

It is an object of this invention to provide a method of fabricating a pipe assembly which will overcome the difficulties and disadvantages discussed above. More specifically, it is an object of the invention to provide a method of fabricating a pipe assembly wherein a pair of pipes are connected in open communication with the third pipe at a common juncture which will minimize scrap loss, which will reduce the number of operations necessary to effect such fabrication, which will permit the fabrication of such pipe assemblies having different size openings between the pipes, and which will permit the pipes to be connected at the desired angles with respect to each other.

In accordance with the preferred form of the invention, as it is employed in making a curved pipe assembly, a first pipe is subjected to a series of bending operations to provide it with a plurality of axially spaced bends. A pair of cuts are then made through the pipe to cut it into two different pipe sections. Said cuts are made in intersecting planes and at equal angles to the pipe axis so that the pair of faces on the cut end of one of the pipe sections will have the same lengths as the corresponding pair of faces on the cut end of the other pipe section. The two pipe sections are then rigidly joined together along one pair of their corresponding faces to dispose them at an angle to each other and to define an opening at their juncture. A third pipe, which may or may not be bent, has one of its ends expanded into a generally elliptical configuration and is rigidly connected to the two pipe sections at their juncture with its expanded open end extending around the opening at the juncture of said pipe sections to thus dispose the two pipe sections in open communication with the third pipe and form the pipe assembly.

Figure 1:
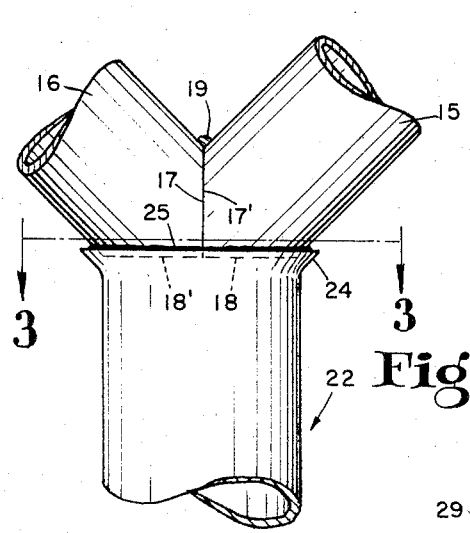
Figure 3:
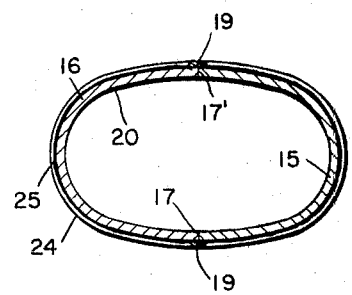
Figure 5:
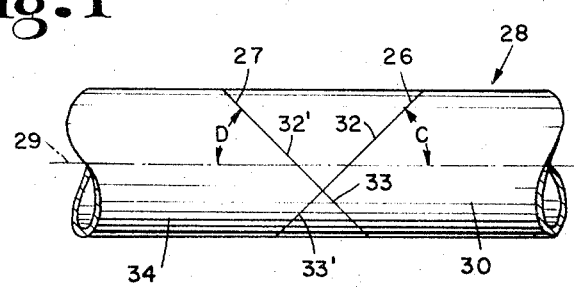
Figure 4:
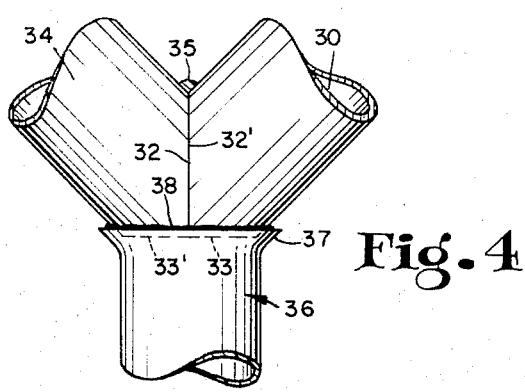

Other objects and features of the invention will become apparent from the more detailed description which follows and from the accompanying drawing, in which:

FIG. 1 is a side elevation of a pipe assembly made according to the invention;
FIG. 2 is a side elevation of a pipe cut to form a pair of the pipe sections;
FIG. 3 is a transverse section taken on the line 3—3 of FIG. 1;
FIG. 4 is a side elevation of a pipe assembly similar to the assembly shown in FIG. 1, but employing a pair of pipe sections cut in the manner indicated in FIG. 5; and
FIG. 5 is a side elevation of a pipe cut to form a pair of the pipe sections shown in FIG. 4.

As shown in FIG. 2, in forming a pipe assembly according to our invention wherein a pair of pipe sections in the assembly are bent, a first pipe 10 is bent at the desired locations to form a plurality of bends 11. Said pipe is then held in position and cut along lines 12 and 14 to divide it into two pipe sections 15 and 16. During the cutting step, one of the cuts is made, and then the two separated pipe sections are held in coaxial alignment with their single cut faces abutting each other while the second cut is made. As shown, cuts 12 and 14 lies in intersecting planes and are at equal angles with respect to the axis 17 of pipe 10. Thus, as shown in FIG. 2, angle A equals angle B. Such cuts provide the ends of pipe sections 15 and 16 with pairs of angularly disposed cut faces 17 and 17' and 18 and 18'. With angle A equaling angle B, it will be seen that the lengths of faces 17 and 18 are equal to the lengths of faces 17' and 18', respectively. By employing this type of X-cut the only scrap generated in the formation of pipe sections 15 and 16 will be the wedges of pipe material interposed between faces 17 and 17' and 18 and 18'.

After the two sections 15 and 16 have been formed, faces 17 and 17' are brought into abutting contact and are rigidly connected together, such as by welding at 19. This rigidly joins the pipe sections 15 and 16 at an angle to each other and forms an opening 20 at their juncture, said opening being defined by the cut faces 18 and 18'. As shown in FIG. 1, a third pipe 22 has one of its ends expanded outwardly, as at 24, into a generally elliptical belled configuration. The belled end of pipe 22 is then placed around the opening 20 and pipe 22 is rigidly connected to pipe sections 15 and 16, as by welding at 25, pipe 22 being in open communication with pipe sections 15 and 16. If desired, pipe 22 can be bent prior to its connection to the pipe sections 15 and 16.

As shown in FIG. 2, cuts 12 and 14 intersect the pipe axis 17 so that faces 17, 17', 18, and 18' all have substantially the same lengths. Thus, when the faces 17 and 17' are connected to each other, the opening 20 will be relatively large. The size of said opening and the angles of interconnection between the pair of sections and between the sections and pipe 22 can be adjusted by adjusting the angle of cuts 12 and 14 with respect to the pipe axis 17 and/or adjusting the distance at which their line of intersection is offset with respect to said pipe axis.

A pipe assembly is shown in FIG. 4 wherein the pipe sections formed from the single length of pipe are cut in planes which intersect each other in offset relation to the pipe axis. Thus, as shown in FIG. 5, a pair of intersecting cuts 26 and 27 are made in pipe 28 with said cuts intersecting each other in offset relation to the pipe axis 29. Cuts 26 and 27 are at equal angles C and D to the pipe axis 29 whereby the cut end of pipe section 30 has a pair of faces 32 and 33 with lengths corresponding to the lengths of the cut faces 32' and 33' respectively, on pipe section 34.

As shown in FIG. 4, the cut pipe sections 30 and 34 are joined together along their faces 32 and 32' as by weld 35 so that the opening defined by the faces 33 and 33' will be relatively small. Should it be desired to form a large opening at the juncture of the two pipe sections, it is merely necessary to join sections 30 and 34 along their faces 33 and 33' whereby the faces 32 and 32' will define an enlarged opening at the juncture of the two pipe sections.

As with the modification shown in FIG. 1, the pipe sections 30 and 34 are connected to a third pipe 36 which may or may not be bent. Prior to connecting it to sections 30 and 34 pipe 36 has one of its ends expanded outwardly into an elliptical bell 37. It is then rigidly connected to the sections 30 and 34' in open communication therewith as by weld 38. Since the opening defined by the faces 33 and 33' will be relatively small, pipe 36 can have a smaller diameter than the diameter of pipe sections 30 and 34. Conversely, if the pipe sections 30 and 34 are joined together along their faces 33 and 33', the opening defined by their faces 32 and 32' will be relatively large and pipe 36 will have to have a larger diameter than the diameters of sections 30 and 34.

Although our invention has been described as being particularly well adapted in the formation of a pipe assembly for exhaust systems for automotive vehicles, it is to be understood, of course, that our invention can be used in fabricating pipe assemblies for any use wherein it is desired to connect a pair of pipes to a third pipe at a common junction.

We claim:
1. A method of fabricating a pipe assembly, comprising the steps of forming a pair of cuts through a pipe to form first and second pipe sections, said cuts being in intersecting planes and at equal angle to the pipe axis whereby the cut end of each of said sections has a pair of angularly disposed faces of the same lengths as the faces on the other section, joining said first and second sections along one pair of said faces to rigidly interconnect said sections at an angle to each other and to define an opening at their juncture, and connecting an open end of a second pipe to said sections at their juncture and with said open end extending around said opening.

2. The invention as set forth in claim 1 in which said cuts intersect each other on the axis of said first pipe.

3. The invention as set forth in claim 1 in which said cuts intersect each other in offset relation to the pipe axis.

4. The invention as set forth in claim 1 with the addition that the open end of said second pipe is expanded into a generally elliptical configuration prior to the step of connecting it to said first and second pipe sections.

5. A method of fabricating a pipe assembly, comprising the steps of forming a plurality of axially spaced bends in a pipe, forming a pair of cuts through said pipe, said cuts being intersecting planes and at equal angles to the pipe axis at said cuts whereby the cut end of each of said sections has a pair of angularly disposed faces of the same lengths as the faces on the other section, joining said first and second sections along one pair of said faces to rigidly interconnect said sections at an angle to each other and to define an opening at their juncture, and connecting an open end of a second pipe to said sections at their juncture and with said open end extending around said opening.

6. A method of fabricating a pipe assembly, comprising the steps of forming a first cut through a first pipe at an angle transverse to the pipe axis to form first and second pipe sections, disposing said pipe sections in coaxial abutting relation along said first cut, forming a second cut through said pipe sections at an angle transverse to their axis and intersecting said first cut whereby each section has a pair of faces on its cut end, the angles of said first and second cuts being equal to each other whereby the pair of faces in the cut end of said first section have the same lengths as the pair of faces on the cut end of said second section, joining said first and second sections along one pair of said faces to rigidly interconnect said sections at an angle to each other and to define an opening at their juncture, and connecting an open end of a second pipe to said sections at their juncture and with said open end extending around said opening.

References Cited
UNITED STATES PATENTS

| | | | |
|---|---|---|---|
| 2,359,350 | 10/1944 | Bruno | 29—482 X |
| 2,736,949 | 3/1956 | Kraemer | 285—155 X |
| 3,319,650 | 5/1967 | Peterson | 285—155 X |

JOHN F. CAMPBELL, *Primary Examiner.*

J. L. CLINE, *Assistant Examiner.*

U.S. Cl. X.R.

29—482; 285—155